United States Patent [19]
Gold et al.

[11] Patent Number: 5,067,799
[45] Date of Patent: Nov. 26, 1991

[54] BEAM COMBINING/SPLITTER CUBE PRISM FOR COLOR POLARIZATION

[75] Inventors: Ronald S. Gold, Scottsdale; Karen E. Jachimowicz, Goodyear, both of Ariz.

[73] Assignee: Honeywell Inc., Minneapolis, Minn.

[21] Appl. No.: 457,665

[22] Filed: Dec. 27, 1989

[51] Int. Cl.$^5$ .................. G02B 27/10; G02B 27/28
[52] U.S. Cl. .................... 359/490; 358/61; 359/495; 359/638
[58] Field of Search ............ 350/397, 400, 401, 402, 350/171, 172, 173, 169, 403, 404, 408, 174; 358/55, 61

[56] References Cited

U.S. PATENT DOCUMENTS

| | | | |
|---|---|---|---|
| 2,958,258 | 11/1960 | Kelly | 350/173 |
| 3,497,283 | 2/1970 | Law | 350/173 |
| 3,704,061 | 11/1972 | Travis | 350/397 |
| 3,767,290 | 10/1973 | Lang et al. | 350/173 |
| 4,286,286 | 8/1981 | Jurisson et al. | |
| 4,502,783 | 3/1985 | Lau et al. | 350/402 |
| 4,504,856 | 3/1985 | Jackman | |
| 4,588,259 | 5/1986 | Sheiman | |
| 4,670,744 | 6/1987 | Buzak | |
| 4,717,239 | 1/1988 | Steenblik | |
| 4,723,159 | 2/1988 | Imsand | |
| 4,737,840 | 4/1988 | Morishita | |
| 4,772,094 | 9/1988 | Sheiman | |

FOREIGN PATENT DOCUMENTS

| | | | |
|---|---|---|---|
| 2059059 | 6/1971 | Fed. Rep. of Germany | 350/173 |
| 0048814 | 3/1986 | Japan | 350/401 |

Primary Examiner—Bruce Y. Arnold
Assistant Examiner—R. D. Shafer
Attorney, Agent, or Firm—John G. Shudy, Jr.

[57] ABSTRACT

A cube bi-prism for beam combining and/or splitting through color and polarization multiplexing.

9 Claims, 2 Drawing Sheets

BEAM COMBINING/SPLITTER CUBE PRISM FOR COLOR POLARIZATION

FIELD OF THE INVENTION

The present invention pertains to light beam control, particularly to beam combining and splitting dependent on beam color and polarization. More particularly, the invention pertains to light beam combining and splitting.

BACKGROUND OF THE INVENTION

Various approaches have been used for beam combining and splitting. A most common one has been a quad-combining prism. The "quad" prism (i.e., a four piece prism such four solid pieces, fluid-filled pieces or other sorts of media) has been difficult to fabricate and align for precise operation. Such prism is disclosed in U.S. patent application of Ser. No. 07/437,488.

SUMMARY OF THE INVENTION

The present invention is a bi-prism for combining and/or splitting light beams. The bi-prism is easier to fabricate and align than the quad-prism since the latter is a four piece device and the former is a two piece prism. The bi-prism functions with similar results but in a different way than the quad-prism. The invention is useful in many applications where polarized color combining and splitting is advantageous.

DESCRIPTION OF THE PREFERRED EMBODIMENT

Figure 1:
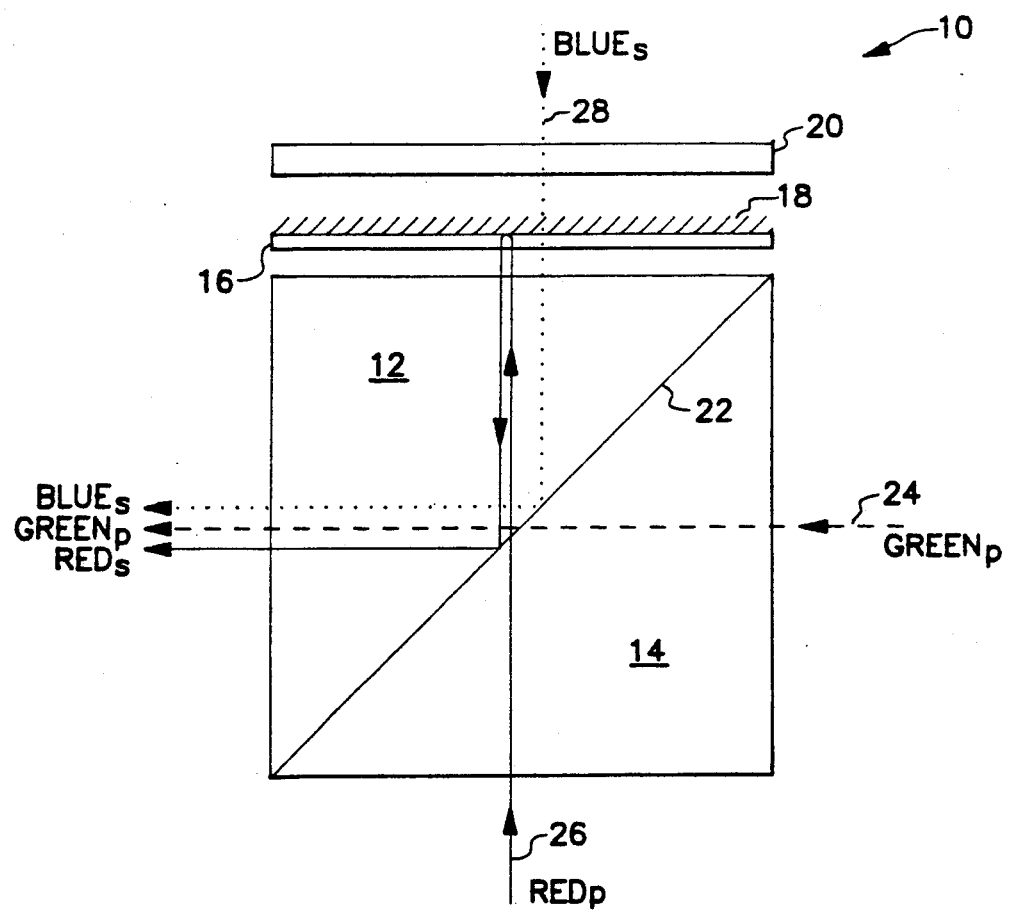
FIG. 1 illustrates a cube bi-prism light beam combiner/splitter.
Figure 2:
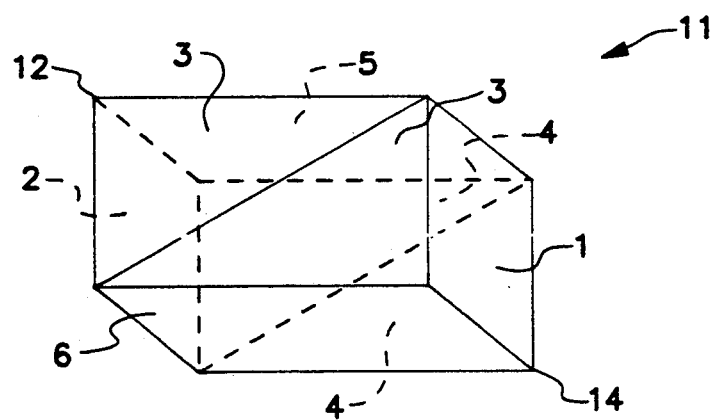
FIG. 2 is a perspective view of the cube bi-prism.

FIG. 1 is an illustration of present invention 10. Invention 10 comprises two prisms 1 and 14, respectively, having polarized coating 22 at their junction, quarter-wave plate 16 having a thin-film dichroic coating 18, and three-quarter-wave plate 20. FIG. 2 is a perspective view of prisms 12 and 14, showing six labelled sides 1, 2, 3, 4, 5 and 6 of bi-prism 11. Prisms 12 and 14 share sides 3 and 4.

In a typical application of device 10, green light 24 having "P" polarization is transmitted through side 1 into prism 14, through polarizing coating 22 and into prism 12. Light 24 exits side 2. Light having "P" polarization has its E field vector parallel to the plane of incidence. Light having "S" polarization has its E field vector perpendicular to the plane of incidence. Polarizing coating 22 transmits light having "P" polarization and reflects light having "S" polarization.

Red light 26 having "P" polarization enters prism 14 through side 6, approximately perpendicular to the direction of green light 24. Red light 26 is transmitted through prism 14, coating 22 and prism 12. Red light 26 exits prism 12 from side 5 and proceeds through quarter-wave plate or retarder 16 until it is reflected by coating 18 on plate 16. Coating 18 is designed to reflect red light and transmit blue light. The fast axis of quarter-wave plate 16 is oriented 45 degrees to the axis of incoming linearly polarized light, such as "P" polarized red light 26, causing linearly polarized light 26 to become circularly polarized. Upon reflection of circularly polarized light from coating or filter 18, the orientation of circular polarization of light 26 is reversed. Passage of red light 26 from filter 18 back through quarter-wave plate 16 changes the circular polarization of light 26 back to linear polarization, but with its orientation orthogonal to the original input "P" polarization, thereby resulting in "S" polarized red light 26 entering prism 12 through side 5. Light 26 of "S" polarization impinges coating 22 and is reflected by coating 22 out of prism 12 through side 2.

Blue light 28 having the "S" polarization travels through three-quarter-wave retarder 20, optical means or film coating 18 and quarter-wave retarder 16. A full wave of retardation is introduced into blue light 28, by retarders 20 and 16, which has no resultant effect on the "S" polarization of light 28. If blue light 28 were "P" polarized, then three-quarter-wave retarder 20 could be replaced with a quarter-wave retarder for a total of half-wave retardation, thereby rotating the polarization vector (i.e., E field vector) 90 degrees to the desired "S" polarization for light 28. Blue light 28 enters prism 12 through side 5 and impinges coating 22. Coating 22 reflects "S" polarized light 28 out of prism 12 through side 2. Thus, green light 24, red light 26 and blue light 28 exit prism 12 in the same direction of propagation. Light 24, 26 and 28 may be of other colors, and films 18 and 22 may have various properties, depending upon the application of device 10.

Figure 3:
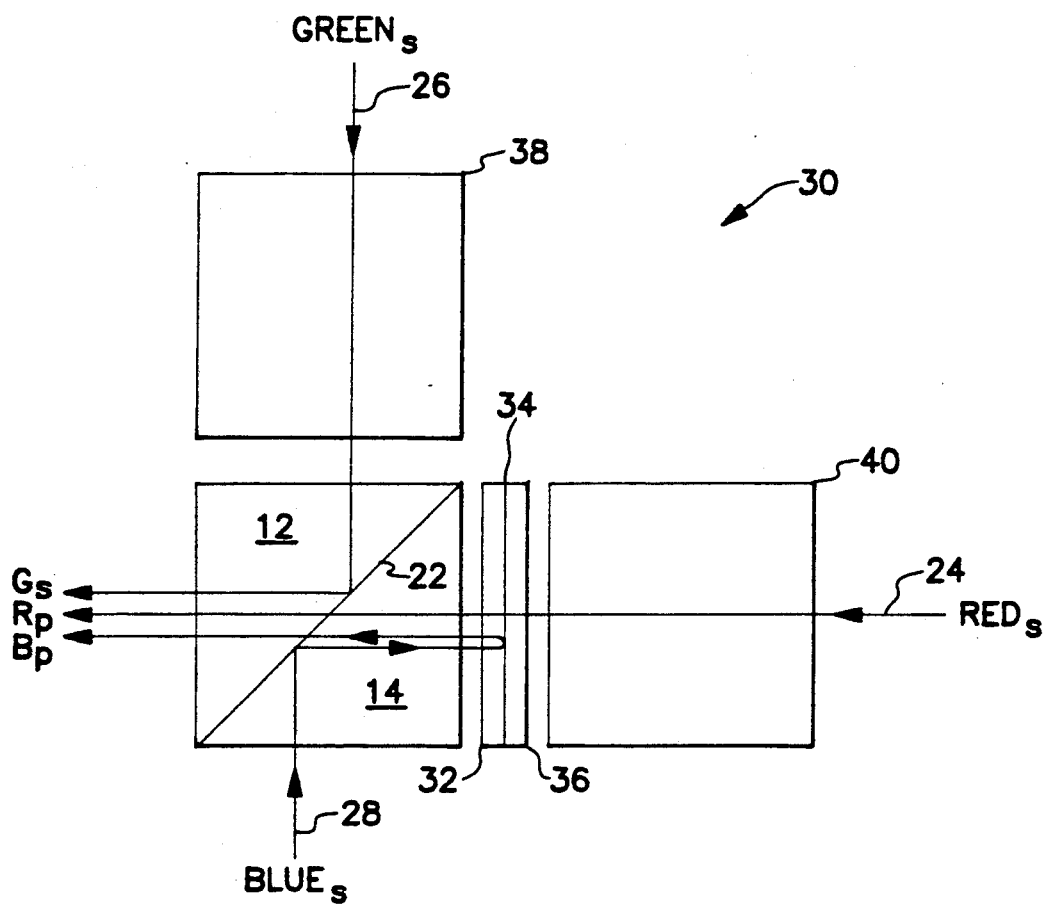
FIG. 3 illustrates another embodiment of the invention.

FIG. 3, in conjunction with FIG. 2, reveals embodiment 30 of the present invention having optical compensation for at least two of the three light beams. Optical compensation provides optical path length adjustment. Such compensation may be in the form of lenses, transparent blocks or other means. Green light 26 having the "S" linear polarization is transmitted through compensation block 38 and into prism 12 through side 5. Light 26 impinges coating 22 which reflects "S" polarized light and transmits "P" polarized light. Thus, light 26 is reflected by coating 22 and then light 26 exits prism 12 through side 2. Red light 24 is transmitted through compensation block 40, quarter-wave plate 36, thin film coating 34 which is a long wave pass filter (i.e., it reflects blue and transmits red light), and quarter wave plate 32. Quarter wave plates 36 and 32 cause a total of one-half wave retardation of light 24, thereby rotating the polarization vector 90 degrees to the "P" polarization position (i.e., quarter-wave (half-wave total) plates each has an axis at 45 degrees to the E field vector of polarized light to rotate the vector for a total of 90 degrees). "P" polarized red light 24 exits plate 32, enters prism 14 through side 1, passes through coating 22 into prism 12 and exits prism 12 through side 2. "S" polarized blue light 28 enters prism 14 through side 6 and is reflected by coating 22 out of prism 14 through side 1 and light 28 goes through quarter-wave plate 32 to coating 34. Light 28 is then reflected by coating 34 back through quarter-wave plate 32. Since light 28 goes through plate 32 twice, there is a total of one-half wave retardation of light 28, thereby rotating the polarization vector 90 degrees to a "P" polarization position. Light 28 returning from plate 32 reenters prism 14 through side 1 and passes through coating 22 into prism 12. Light 28 exits prism 12 through side 2 in the same direction of propagation as light 24 and 26.

Light 24, 26 and 28 may be any combination of colors. Films or coatings 22 and 34 may have various transmissive and reflective properties as needed to accommodate the designated colors of light 24, 26 and 28, for achieving desired properties of device 30.

We claim:

1. A color polarization cube prism for combining/splitting light, comprising:
   a cube, composed of an essentially transparent material, having first, second, third, four, fifth and sixth sides, and having first and second halves of said cube juxtaposed at a plane, wherein the first and second halves have boundaries on the third and fourth sides;
   a first optical coating situated between the first and second halves;
   a first wave retarder proximate to the third side;
   a second wave retarder proximate to said first wave retarder; and
   a second optical coating situated between said first and second wave retarders; and
   wherein:
      said first optical coating transmits light having a first polarization and reflects light having a second polarization;
      said second optical coating is a dichroic filter;
      said first wave retarder is a quarter-wave plate;
      said second wave retarder is a three-quarter-wave plate;
      a first light, having a first polarization, enters the first side of said cube, passes through said first optical coating, and exits said cube at the second side;
      a second light, having a second polarization, passes through said second wave retarder, said second optical coating and said first wave retarder, enters the fifth side of said cube, impinges the first optical coating and is reflected out of said cube through the second side; and
      a third light, having a first polarization, enters the sixth side of said cube, passes through the first optical coating, exits said cube at the fifth side, passes through said first retarder, impinges said second optical coating and said third light is reflected by said second optical coating back through said first retarder and said third light, having its polarization changed to the second polarization, passes through the fifth side into said cube, impinges said first optical coating and said third light is reflected out of said cube through the second side.

2. Apparatus of claim 1 wherein:
   said first light is green;
   said second light is blue; and
   said third light is red.

3. Apparatus of claim 1 wherein:
   said first light is blue;
   said second light is red; and
   said third light is green.

4. A color polarization cube prism for combining/splitting light, comprising:
   a cube, composed of an essentially transparent material, having first, second, third, fourth, fifth and sixth sides, and having first and second halves of said cube juxtaposed at a plane, wherein the first and second halves have boundaries on the third and fourth sides;
   a first film coating between the first and second halves;
   a first wave retarder proximate to the first side;
   a second wave retarder proximate to said first wave retarder; and
   a second film coating situated between said first and second wave retarders; and
   wherein:
      said first film coating transmits light having a first polarization and reflects light having a second polarization;
      said second film coating is a dichroic filter;
      said first and second wave retarders are quarter-wave plates;
      a first light, having a second polarization, enters said cube through the fifth side, impinges said first film coating and said first light is reflected by said first film coating, and said first light exits said cube through the second side;
      a second light, having a second polarization, enters said cube through the sixth side, impinges said fist film coating, said second light is reflected by said first film coating, said second light exits said cube through the first side, said second light passes through said first wave retarder, impinges said second film coating, said second light is reflected by said second film coating through said first wave retarder and said second light, having its polarization changed to the first polarization, passes through the first side into said cube, through said first film coating and out of said cube through the second side; and
      a third light, having the second polarization, passes through second wave retarder, second film coating, first wave retarder and said third light, having its polarization changed to the first polarization, enters through the first side into said cube, passes through said first film coating and exits said cube through the second side.

5. Apparatus of claim 4 further comprising:
   a first compensator block proximate to the fifth side of said cube such that said first light passes through said first compensator block before entering said cube through the fifth side; and
   a second compensator block proximate to said second wave retarder such that said third light passes through said second compensator block before entering said second wave retarder.

6. Apparatus of claim 5 wherein:
   said first light is a first color;
   said second light is a second color; and
   said third light is a third color.

7. Apparatus of claim 6 wherein:
   said first color is green;
   said second color is blue; and
   said third color is red.

8. Apparatus of claim 6 wherein:
   said first color is red;
   said second color is green; and
   said third color is blue.

9. Apparatus of claim 4 further comprising an optical compensating means proximate to said fifth side of said cube.

* * * * *